United States Patent [19]

Greene

[11] 4,337,628

[45] Jul. 6, 1982

[54] UNIVERSAL JOINT WITH UNITARY FACE SEAL AND RETAINER ASSEMBLY

[75] Inventor: C. Roger Greene, Rockford, Ill.

[73] Assignee: Borg-Warner Corporation, Chicago, Ill.

[21] Appl. No.: 179,928

[22] Filed: Aug. 20, 1980

[51] Int. Cl.³ .............................................. F16D 3/26
[52] U.S. Cl. .................................... 464/131; 277/48; 308/187.2
[58] Field of Search ............... 64/17 A, 17 R; 277/35, 277/47, 48, 49, 50, 166; 308/187.1, 187.2

[56] References Cited

U.S. PATENT DOCUMENTS

| 2,773,366 | 12/1956 | Slaght | 64/17 A |
| 2,802,351 | 8/1957 | Anderson | 64/17 A |
| 3,138,942 | 6/1964 | Kayser | 64/17 A |
| 3,457,732 | 7/1969 | Decouzon | 64/17 R |
| 3,479,840 | 11/1969 | Meyers | 64/17 A |
| 3,588,126 | 6/1971 | McKillop | 277/35 |
| 3,858,413 | 1/1975 | Nemtsov et al. | 64/17 A |

Primary Examiner—Ira S. Lazarus
Assistant Examiner—Magdalen Moy
Attorney, Agent, or Firm—Julian Schachner

[57] ABSTRACT

A universal joint includes a unitary face seal and retainer assembly which provides a face seal for retaining lubricant and excluding contamination. The assembly determines the limits of relative movement between the trunnion and bearing block during assembly, shipment and installation such that the seal members are not damaged during assembly and the face seal is not broken during shipment and installation.

9 Claims, 3 Drawing Figures

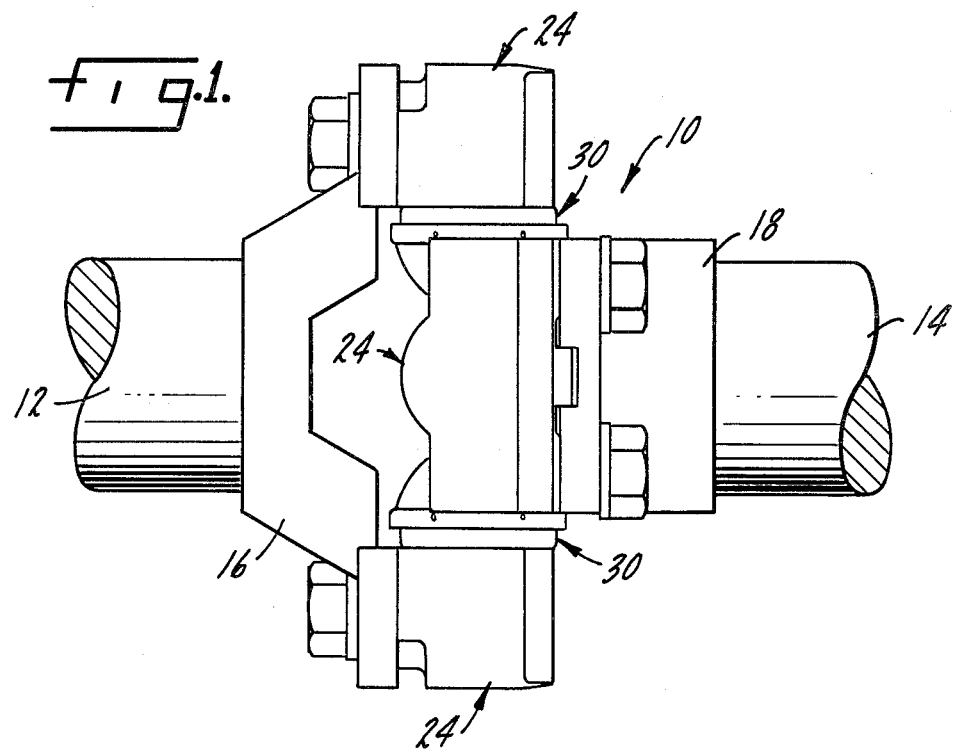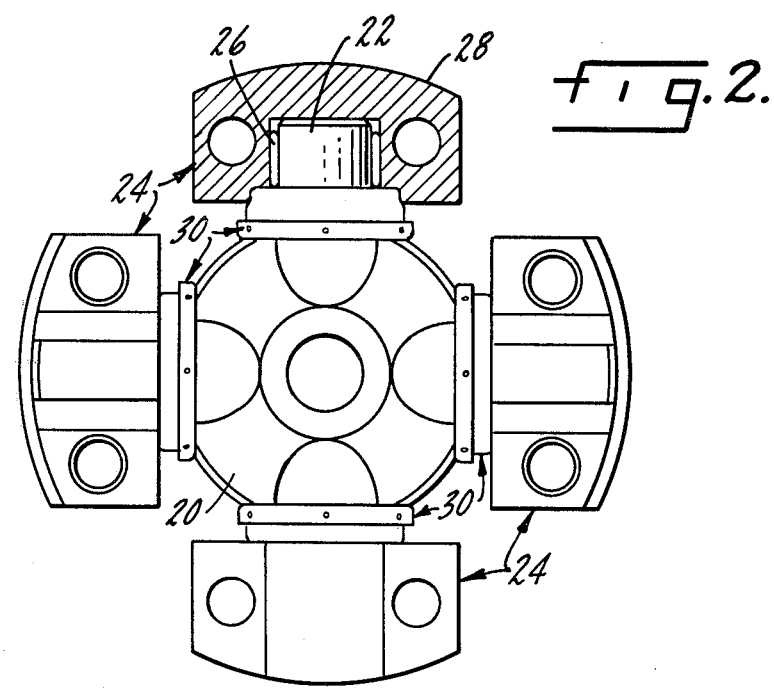

UNIVERSAL JOINT WITH UNITARY FACE SEAL AND RETAINER ASSEMBLY

BACKGROUND OF THE INVENTION

This invention relates generally to universal joints. More particularly, it relates to a universal joint which incorporates a unitary face seal and retainer assembly for retaining lubricant in the bearing area and for excluding contamination therefrom.

Universal joints used in automotive applications generally, and construction and agricultural applications in particular, often must operate under severe environmental conditions. If excessive wear is to be prevented in such applications, the bearings associated with such joints must be kept adequately lubricated. In addition, they must be protected from contamination by foreign matter.

In the past, various forms of seals were developed in an effort to prolong the operating life of universal joints. These prior seals were not satisfactory, primarily because they did not seal sufficiently well to retain lubricant and exclude contamination. Even with frequent lubrication, it was found that foreign matter entered the bearing area and caused wear at an unacceptably high rate. Attempts also were directed toward development of so-called permanently lubricated seals intended to provide perfect sealing. However, it was found that rapid wear and resulting universal joint failure occurred in these prior seals as well. Prior seals generally were of the lip type, as space limitations precluded the use of face seals. Also, stack-up tolerances inherent in universal joint assembly resulted in a working range that generally was considered to be excessive for face seals.

Further, prior seals often were crushed during final assembly of a typical universal joint. Also, for shipment and during installation of the universal joints, there often was the necessity to provide some external mechanism for retaining the bearing blocks on their associated spider trunnions.

There remains a need in the art to provide a simple, inexpensive unitary seal and retainer assembly for a universal joint, which assembly will effectively increase the working life of the universal joint. The assembly preferably should incorporate a face seal, should prevent crushing during assembly, and should retain the associated bearing block during shipment and installation.

SUMMARY OF THE INVENTION

The primary object of this invention is to meet the needs noted above. To that end, there is provided a universal joint incorporating unitary face seal and retainer assemblies which permit universal joint use for extended periods of time without loss of lubricant or contamination by foreign matter.

Each assembly includes a cartridge pressed onto a spider trunnion and a shroud pressed into the counterbore of an associated bearing block. A washer is spring biased towards face contact with a mating face to establish a face seal.

Slight assembly play is limited by interaction between the cartridge and shroud. This limited play prevents crushing of the seal elements during assembly, and retains the bearing block on the spider trunnion during shipment and installation. By eliminating the need for some external retaining mechanism, a single assembly accommodates both right- and left-hand universal joint kits.

The result is a simple, inexpensive, long-wearing unitary face seal and retainer assembly for use in a universal joint.

BRIEF DESCRIPTION OF THE DRAWINGS

The objects and advantages of this invention will become apparent to those skilled in the art upon careful consideration of the specification herein, including the drawings, wherein:

FIG. 1 is an elevational view of the universal joint;

FIG. 2 is an elevational view, partially in section, of a universal joint kit including the spider with the bearing blocks mounted on the trunnions.

Figure 3:
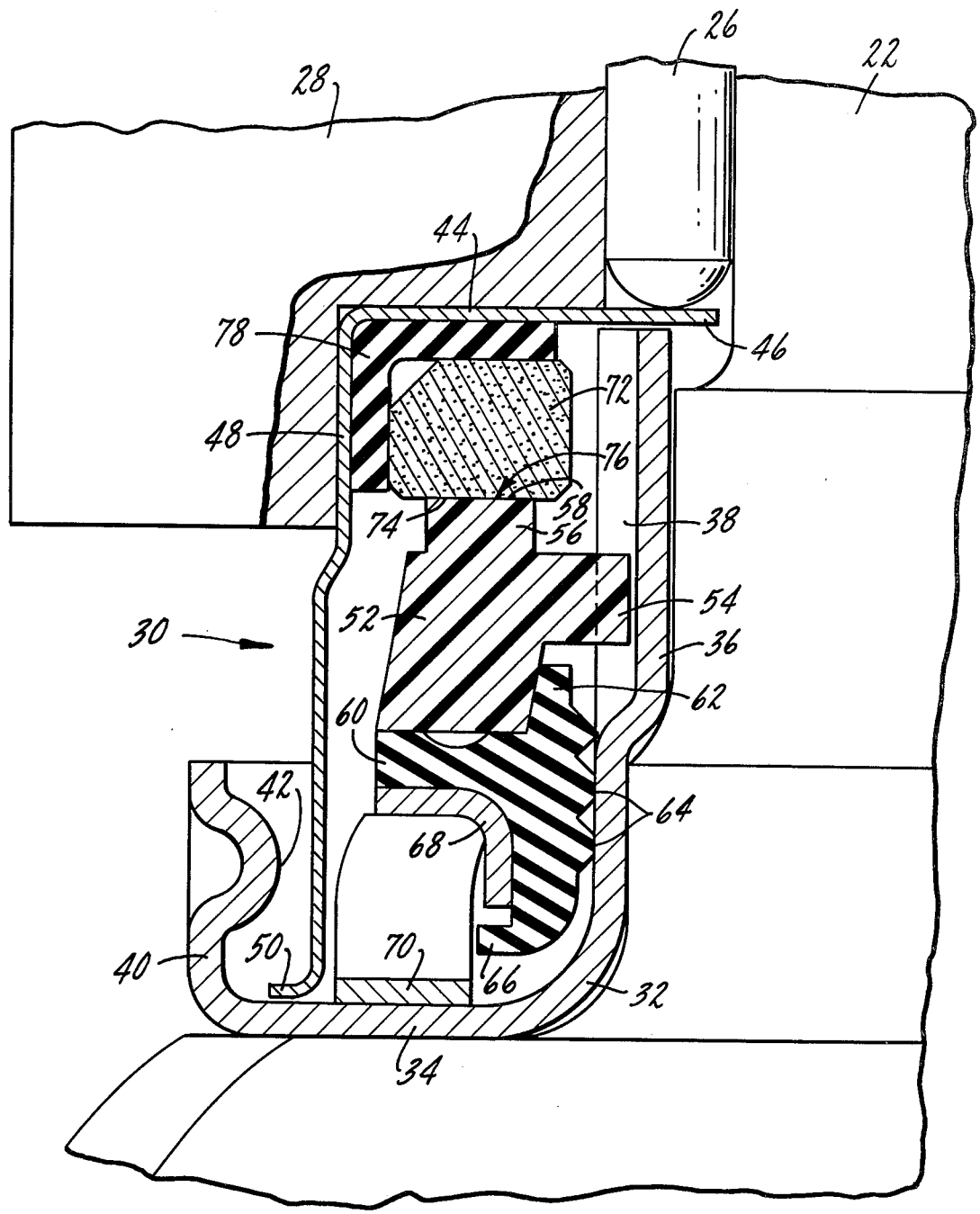
FIG. 3 is an enlarged partial sectional view of the unitary face seal and retainer assembly.

While this invention is susceptible of embodiment in many different forms, there is shown in the drawings and herein will be described in detail a preferred embodiment. It should be understood that the present disclosure is considered to be an exemplification of the principles of the invention, and is not intended to limit the invention to this embodiment.

DESCRIPTION OF A PREFERRED EMBODIMENT

Referring now to the drawings in greater detail, there is shown generally a universal or cardan joint 10 interconnecting two rotatable shafts 12 and 14. Universal joint 10 includes two yokes 16 and 18 respectively secured to shafts 12 and 14.

A spider 20 includes four spaced trunnions 22 on which respectively are mounted four bearing assemblies 24, each composed of a plurality of needle bearing elements 26 supported in a bearing block 28. This arrangement permits relative rotary oscillation between each trunnion 22 and its associated bearing block 28. Opposed pairs of bearing blocks 28 respectively are secured to yokes 16 and 18.

A unitary face seal and retainer assembly 30 is provided for each trunnion 22 and associated bearing block 28. Each assembly 30 includes an annular cartridge 32 pressed onto an associated trunnion 22 so as to establish an interference fit therewith. Cartridge 32 includes a base portion 34, an axially extending inner portion 36 which defines a plurality of spaced, outwardly extending drive lugs 38, and an axially extending outer portion 40 which defines a plurality of spaced, inwardly facing dimples 42.

An annular shroud 44 is pressed into a counterbore of bearing block 28 so as to establish an interference fit therewith. Shroud 44 includes a top portion 46 which serves as a retainer for bearing elements 26. Shroud 44 also includes an axially extending skirt portion 48 which is crimped to form an outwardly extending flange portion 50 at its base.

An annular washer member 52, preferably formed from a phenolic resin, includes a plurality of spaced, inwardly extending lugs 54 engaged with drive lugs 38 so as to be driven thereby. Washer 52 also includes an upper portion 56 defining a first sealing surface 58.

An annular boot member 60, preferably formed from an elastomer, sealingly engages washer 52. Boot 60 includes a lip 62 which is biased by lubricant pressure between boot 60 and inner portion 36 to increase this seal. Boot 60 also includes a plurality of sealing surfaces 64 in sliding contact with inner portion 36. As a result, boot 60 may slide axially relative to cartridge 32 without flexing, and thus without sustaining bending stress.

In addition, boot 60 includes a lip 66 extending outwardly to partially retain an annular ferrule member 68. A suitable spring 70 in the form of a wave washer or the like reacts against base portion 34 and acts upon ferrule 68 to bias washer 52 upwardly.

An annular mating face member 72, preferably formed from powder metal, defines a second sealing surface 74. Surfaces 58 and 74 together form a face seal 76.

An annular bushing member 78, preferably formed from an elastomer, is sealingly interposed between member 72 and shroud 44.

For assembly, bushing 78 and mating face 72 are inserted into shroud 44. Spring 70, ferrule 68, boot 60 and washer 52 are inserted into cartridge 32, which then is pushed upwardly such that dimples 42 snap over flange 50.

The relationship of cartridge 32 and shroud 44 is such as to provide sufficient relative flexure therebetween in order that dimples 42 may be moved axially upwardly beyond flange 50 upon application of a sufficient axial load during assembly. Thereafter, flange 50 will abut base portion 34 to limit downward movement of bearing block 28, and will abut dimples 42 to limit upward movement of bearing block 28 for a predetermined axial load pull. This load pull may be, for example, within a range of from 10 to 50 pounds.

Assemblies 24 and 30 are placed on trunnion 22 and an axial load of, for example, 200 pounds is applied downwardly on bearing block 28 such that cartridge 32 is pressed onto trunnion 22 and shroud 44 is pressed into bearing block 28. Flange 50 abuts base portion 34 to limit downward movement of shroud 44 relative to cartridge 32. This insures that the members composing assembly 30 are not crushed during the assembly operation. After this operation, slight universal joint relaxation will result in movement of flange 50 away from base portion 34 to the position shown in FIG. 3. This movement is not more than approximately 0.005 inch.

During shipment and installation, assembly 10 will retain bearing block 28 on trunnion 22 due to the fact that upward movement of shroud 44 will cause flange 50 to abut dimples 42. At the point where flange 50 abuts dimples 42, spring 70 continues to bias washer 52 upwardly such that surfaces 58 and 74 maintain face seal 76. Thus, the predetermined limited axial movement allowed between bearing block 28 and trunnion 22 does not break the face seal.

During operation, the lowest friction developed preferably is between surfaces 58 and 74. In this manner, relative rotary oscillation between trunnion 22 and bearing block 28 is accommodated at face seal 76.

It should be apparent to those skilled in the art that there is disclosed herein a universal joint including a unitary face seal and retainer assembly which is simple, inexpensive and easy to manufacture, assemble and install, and which extends significantly the useful working life of the universal joint.

It is not intended that the present invention be restricted in its application to the particular universal joint shown wherein by way of example. It is contemplated that the invention will be utilized on a wide variety of applications in which it is desirable to seal relatively movable parts.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. In a universal joint including a trunnion journalled by bearing elements in a bearing block; the improvement comprising a unitary assembly including a cartridge secured to said trunnion, a shroud axially spaced from said cartridge and secured to said bearing block, a washer member in driven relationship with said cartridge and defining a first axially facing sealing surface, a mating face member engaged with said shroud and defining a second axially facing sealing surface, a boot member engaged with said washer member and in axial sliding sealing contact with said cartridge, and a spring biasing said boot and washer members axially toward said mating face member such that said surfaces are engaged to establish a face seal.

2. The invention of claim 1, said assembly being constructed and arranged to retain said bearing block on said trunnion by allowing only limited relative axial motion of said cartridge and shroud between a contracted position in which said members are not crushed and an expanded position in which said face seal is maintained by the biasing force of seal spring.

3. The invention of claim 2, said cartridge having an inner portion secured to said trunnion, a base portion, and an outer portion defining a plurality of inwardly facing dimples, and said shroud having a skirt defining an outwardly extending flange, said base portion and flange being oriented so as to determine said contracted position, and said dimples and flange being oriented to determine said expanded position.

4. The invention of claim 3, said inner portion defining a plurality of outwardly extending drive lugs, and said washer member being engaged with said drive lugs for effecting said driven relationship with said cartridge.

5. The invention of claim 1, 2, 3 or 4, said shroud being oriented so as to retain said bearing elements in said bearing block.

6. The invention of claim 1, 2, 3 or 4, said assembly further including a ferrule member engaged with said boot member and spring, and a bushing member engaged with said mating face member and shroud, each of said engagements being frictional with the engagement of said surfaces developing less friction than the engagements of said members.

7. In a universal joint including a trunnion journalled in a bearing block; the improvement comprising a cartridge pressed onto said trunnion, a shroud pressed into said bearing block, a bushing in sealing contact with said shroud, a mating face in sealing contact with said bushing, a washer engaged with said cartridge, said mating face and washer together defining a face seal, a boot in sealing contact with said washer and in sliding sealing contact with said cartridge, a ferrule in contact with said boot, and a spring reacting against said cartridge and acting upon said ferrule to bias said ferrule, boot, washer, mating face and bushing toward said shroud.

8. The invention of claim 7, said trunnion and bearing block being relatively movable axially during assembly of said universal joint, and said cartridge and shroud being constructed and arranged to limit the extent of said relative movement such that said assembly is not crushed.

9. The invention of claims 7 or 8, said trunnion and bearing block being relatively movable axially prior to installation of said universal joint, and said cartridge and shroud being constructed and arranged to limit the extent of said relative movement such that said face seal is maintained.

* * * * *

UNITED STATES PATENT AND TRADEMARK OFFICE
CERTIFICATE OF CORRECTION

PATENT NO. : 4,337,628

DATED : July 6, 1982

INVENTOR(S) : C. Roger Greene

It is certified that error appears in the above—identified patent and that said Letters Patent is hereby corrected as shown below:

Column 1, line 16, cancel "in" and insert -- In --.

Column 3, line 65, cancel "wherein" and insert -- herein --.

Column 4, line 28, cancel "seal" and insert -- said --.

Signed and Sealed this

Fifth Day of October 1982

[SEAL]

Attest:

GERALD J. MOSSINGHOFF

Attesting Officer

Commissioner of Patents and Trademarks